(12) United States Patent
Kondo

(10) Patent No.: US 9,304,842 B2
(45) Date of Patent: Apr. 5, 2016

(54) COMPUTER SYSTEM, CONTROL METHOD FOR COMPUTER SYSTEM AND COUPLING MODULE

(71) Applicant: HITACHI, LTD., Tokyo (JP)

(72) Inventor: Yuki Kondo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 128 days.

(21) Appl. No.: 14/288,667

(22) Filed: May 28, 2014

(65) Prior Publication Data

US 2015/0089273 A1 Mar. 26, 2015

(30) Foreign Application Priority Data

Sep. 24, 2013 (JP) ................................. 2013-196829

(51) Int. Cl.
  *G06F 11/00* (2006.01)
  *G06F 11/07* (2006.01)
  *G06F 11/22* (2006.01)
(52) U.S. Cl.
  CPC ........ G06F 11/0727 (2013.01); G06F 11/0751 (2013.01); G06F 11/221 (2013.01); *G06F 11/0709* (2013.01)
(58) Field of Classification Search
  CPC  G06F 11/0709; G06F 11/0727; G06F 11/221
  See application file for complete search history.

(56) References Cited

U.S. PATENT DOCUMENTS

| 6,859,896 B2 * | 2/2005 | Apperley ............ G06F 11/0793 710/71 |
| 7,080,167 B2 * | 7/2006 | Yagisawa ............... G06F 3/0614 710/15 |
| 2007/0168584 A1 | 7/2007 | Kamimura et al. |
| 2010/0251055 A1 | 9/2010 | Murakami et al. |
| 2011/0225341 A1 | 9/2011 | Satoh et al. |
| 2012/0030402 A1 | 2/2012 | Murakami et al. |
| 2012/0136977 A1 | 5/2012 | Factor et al. |

FOREIGN PATENT DOCUMENTS

| JP | 2007-188428 A | 7/2007 |
| JP | 2010-238150 A | 10/2010 |
| JP | 2010-250665 A | 11/2010 |
| JP | 2012-118973 A | 6/2012 |
| JP | 2012-128717 A | 7/2012 |

OTHER PUBLICATIONS

Kondoh et al., Unpublished U.S. Appl. No. 14/045,631, filed Oct. 3, 2013.

* cited by examiner

*Primary Examiner* — Joseph Kudirka
(74) *Attorney, Agent, or Firm* — Mattingly & Malur, P.C.

(57) ABSTRACT

A control method comprising: a first step of detecting, by the server module, a failure in the first interface; a second step of executing, by the server module, given recovery processing when a failure is detected in the first interface; a third step of using, by the coupling module, the first end point to detect a failure in the first interface and output a failure notification; a fourth step of converting, by the coupling module, the failure notification into a notification of disconnection of the first interface, and transmitting the disconnection notification generated by the conversion to the storage module from the second end point; and a fifth step of disengaging, by the storage module, coupling to the server module when the disconnection notification is received from the coupling module.

10 Claims, 6 Drawing Sheets

COMPUTER SYSTEM, CONTROL METHOD FOR COMPUTER SYSTEM AND COUPLING MODULE

CLAIM OF PRIORITY

The present application claims priority from Japanese patent application JP 2013-196829 filed on Sep. 24, 2013, the content of which is hereby incorporated by reference into this application.

BACKGROUND

This invention relates to a technology for accomplishing high-speed data transfer between a server module and a storage module.

As a computer system in which a server and a storage machine accessed by the server are coupled to each other, the following systems are known.

One known computer system of this type couples a server and storage via a network such as a SAN (see, for example, Japanese Patent Application Laid-open No. 2012-118973 (Related-art Example 1)).

In Japanese Patent Application Laid-open No. 2012-118973, there is disclosed a "storage appliance system, which may include at least one application server for locally executing an application, and one or more storage servers in communication with the application server for I/O transmission therebetween".

The computer system described above has a utilization mode that is employed by a large-scale computer system. The computer system has an advantage of being highly flexible in system configuration, but has a problem in that the cost of devices constructing the network such as a SAN is high as well as the running cost.

PCI Express (registered trademark) interfaces are known as high-speed interfaces, and there is a known technology that connects two devices by PCI Express (see, for example, Japanese Patent Application Laid-open No. 2012-128717 (Related-art Example 2)). In Japanese Patent Application Laid-open No. 2012-128717, there is disclosed a technology with which communication between two devices is held through a bridge connection of the two devices with the use of a switch that has a non-transparent port and PCI Express.

There is also known a technology for transmitting error information by a PCI Express protocol when a failure occurs at an end point in a computer system that uses PCI Express (see, for example, Japanese Patent Application Laid-open No. 2010-238150 (Related-art Example 3)).

SUMMARY

In the case of coupling the server and storage machine of Related-art Example 1 with the use of PCI Express of Related-art Example 2, the server is connected to a link A of the non-transparent port by bridge connection and the storage machine is connected to a link B of the non-transparent port by bridge connection. When a failure occurs in the link A connected to the server, the storage machine at the link B is notified of the failure, which necessitates the execution of PCI Express failure recovery processing in the server and the storage machine both.

The resultant problem is that, in the case where one storage machine is coupled to a plurality of servers via a non-transparent port, a failure in a link on the side of one of the servers stops access of the other normal servers to the storage machine due to the need to execute failure recovery processing in the storage machine as well. In other words, a failure in one of the server-side links (I/O interfaces) affects all servers through the storage machine.

In the case where a failure notification is transmitted with the use of Related-art Example 3, the need to expand the PCI Express protocol gives rise to a problem in that existing chip sets and devices cannot be used.

This invention has been made in view of the problems described above, and an object of this invention is to prevent, in a computer system that couples a storage machine and a plurality of servers by I/O interfaces, the impact of a failure in one of the I/O interfaces from spreading to the overall computer system without expanding a protocol.

A representative aspect of this invention is as follows. A computer system, comprising: a server module; a storage module; and a coupling module, wherein the server module comprises: a first processor; a first memory; a first interface for coupling to other devices; a storage access part for requesting access to the storage module via the first interface; a failure detecting part for detecting a failure in the first interface; and a failure processing part for executing given recovery processing when the failure detecting part detects a failure in the first interface, wherein the coupling module comprises: a first end point which is connected to the first interface and, when detecting a failure in the first interface, outputs a failure notification; a second end point which is connected to a second interface of the storage module; a data transfer part for transferring data between the first end point and the second end point; and an event imitation part for converting the failure notification into a notification of disconnection of the first interface when the first end point outputs the failure notification, and transmitting the disconnection notification generated by the conversion to the storage module from the second end point, and wherein the storage module comprises: a second processor; a second memory; a storage device; the second interface for coupling to other devices; a storage control part for receiving an access request through the second interface and accessing the storage device; and a disconnection processing part for disengaging coupling to the server module when the disconnection notification is received from the coupling module.

Thus, in one embodiment of this invention, when the storage module is coupled to a plurality of server modules and a failure occurs in the first interface of one of the server modules, the storage module receives a disconnection notification instead of a failure notification, and disengages the coupling to the server module in which the failure has occurred in the first interface. The impact of the failure in the first interface is prevented from spreading to the overall computer system in this manner. In addition, a protocol of the I/O interfaces does not need to be expanded, which means that the cost of the computer system is kept from rising by using exiting chips and devices.

DETAILED DESCRIPTION OF THE PREFERRED EMBODIMENTS

An embodiment of this invention is described below with reference to the accompanying drawings.

Figure 1:
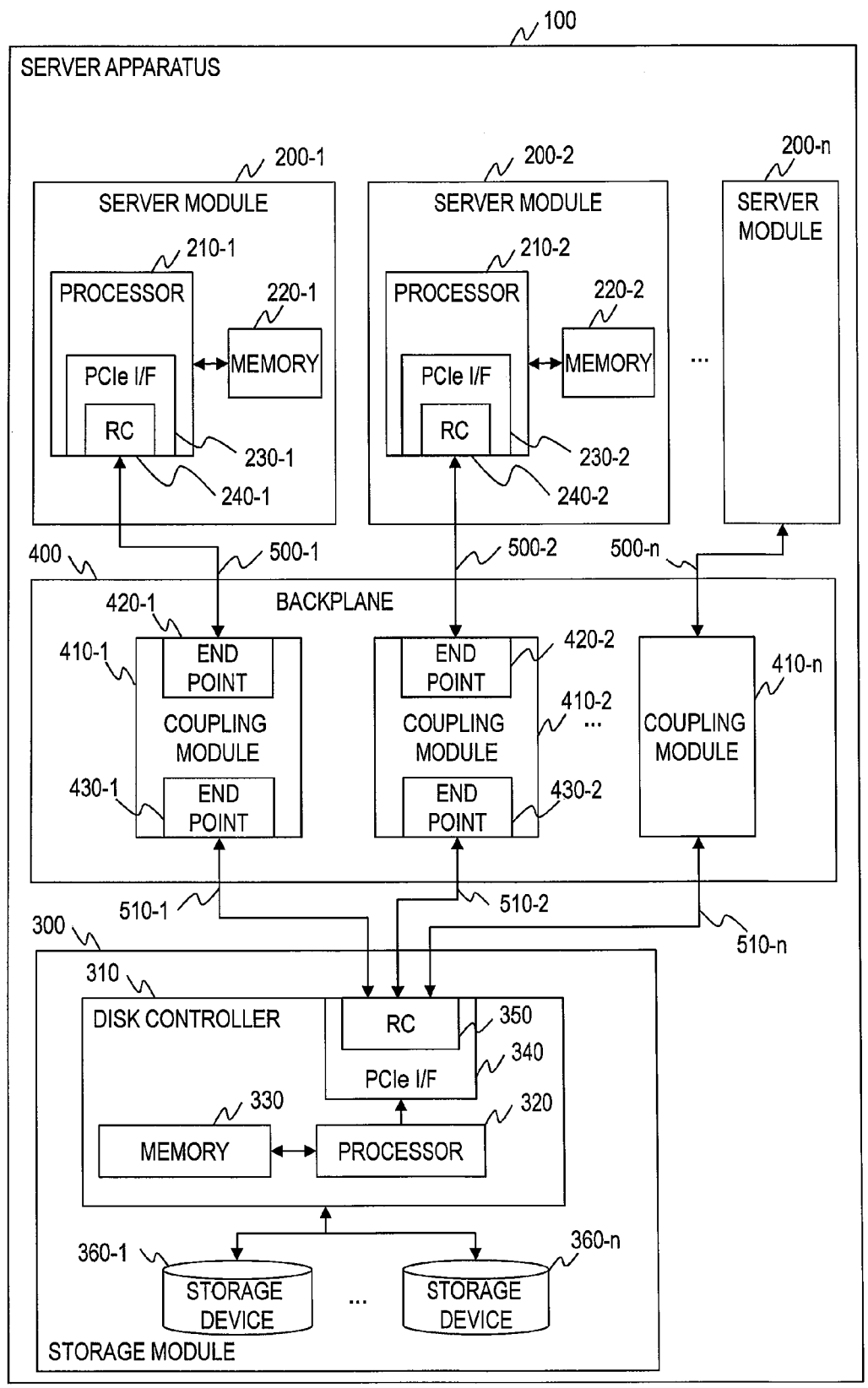
FIG. 1 shows an embodiment of this invention, and is a block diagram illustrating an example of a computer system.

FIG. 1 is a block diagram illustrating an example of a computer system according to the embodiment of this invention.

The computer system of this embodiment is a server apparatus 100, which includes a plurality of server modules 200-1 to 200-n, a storage module 300, and a backplane 400 for coupling the plurality of server modules 200-1 to 200-n and the storage module 300.

The server apparatus 100 has the plurality of server modules 200-1 to 200-n, one storage module 300, and the backplane 400. In the following description, the server modules 200-1 to 200-n are collectively denoted by 200.

The server modules 200 are computers that provide a given business operation. The storage module 300 is a computer that stores data used by the server modules 200. In this embodiment, the storage module 300 provides logical units (LUs) to each server module 200.

The server module 200-1 includes a processor 210-1 and a memory 220-1. The rest of the server modules, 200-2 to 200-n, have the same configuration, and a repetitive description is omitted. The processors 210-1 to 210-n are collectively denoted by 210. The same symbol notation rule applies to other components as well in the following description.

The processor 210-1 includes, as an I/O interface, a PCI Express interface 230-1, which is hereinafter referred to as PCIe I/F 230-1. The PCIe I/F 230-1 includes a root complex 240-1, which is at the top of devices arranged in the tree structure of PCI Express.

Each processor 210 executes a program stored in the relevant memory 220. By executing a program stored in the memory 220 with the processor 210, the server module 200 provides a business operation.

The memory 220 stores a program executed by the processor 210 and data necessary for the execution of the program. What program and information are stored in the memory 220 is described later with reference to FIG. 2.

The program and information stored in the memory 220 may be stored in an LU provided by the storage module 300, or other places. In this case, the processor 210 obtains the program and information from the LU or other storage areas where the program and information are stored, and loads the obtained program and information onto the memory 220.

The storage module 300 includes a disk controller 310 and storage devices 360-1 to 360-n. The components of the storage module 300 are connected to each other via an I/O interface.

The disk controller 310 manages storage areas of the storage devices 360, and controls, among others, the association relations between the server modules 200 and the storage areas. The disk controller 310 includes a processor 320, a memory 330, and, as an I/O interface, a PCI Express interface 340 (hereinafter referred to as PCIe I/F 340).

The processor 320 is connected to the PCIe I/F 340 to transfer data to and from the respective server modules 200 via the PCIe I/F 340. The PCIe I/F 340 includes a root complex 350, which is at the top of devices arranged in the tree structure of PCI Express.

The PCIe I/F 340 is connected to a coupling module 410-1 via a PCI Express link 510-1 to transfer data to and from the server module 200-1. Similarly, the PCIe I/F 340 is connected to a coupling module 410-2 via a PCI Express link 510-2 to transfer data to and from the server module 200-2.

The PCIe I/F 340 in this embodiment can be built from a chip set or the like. However, this embodiment is not limited thereto and, as in the server modules 200, the storage module 300 may be configured so that the processor contains a PCIe I/F.

This embodiment shows an example in which the storage module 300 includes one disk controller 310. Alternatively, the storage module 300 may have a redundant configuration in which a single storage module 300 is provided with a plurality of disk controllers 310.

The processor 320 executes a program stored in the memory 330. By executing a program stored in the memory 330 with the processor 320, functions of the storage module 300 can be implemented.

The memory 330 stores a program executed by the processor 320 and information necessary for the execution of the program. What program and information are stored in the memory 330 is described later with reference to FIG. 3.

The program and information stored in the memory 330 may be stored in the storage devices 360-1 to 360-n, or other places. In this case, the processor 320 obtains the program and information from the storage devices 360-1 to 360-n or other places, and loads the obtained program and information onto the memory 330.

The storage devices 360-1 to 360-n are devices for storing data and can be, for example, hard disk drives (HDDs) or solid state drives (SSDs).

Figure 2:
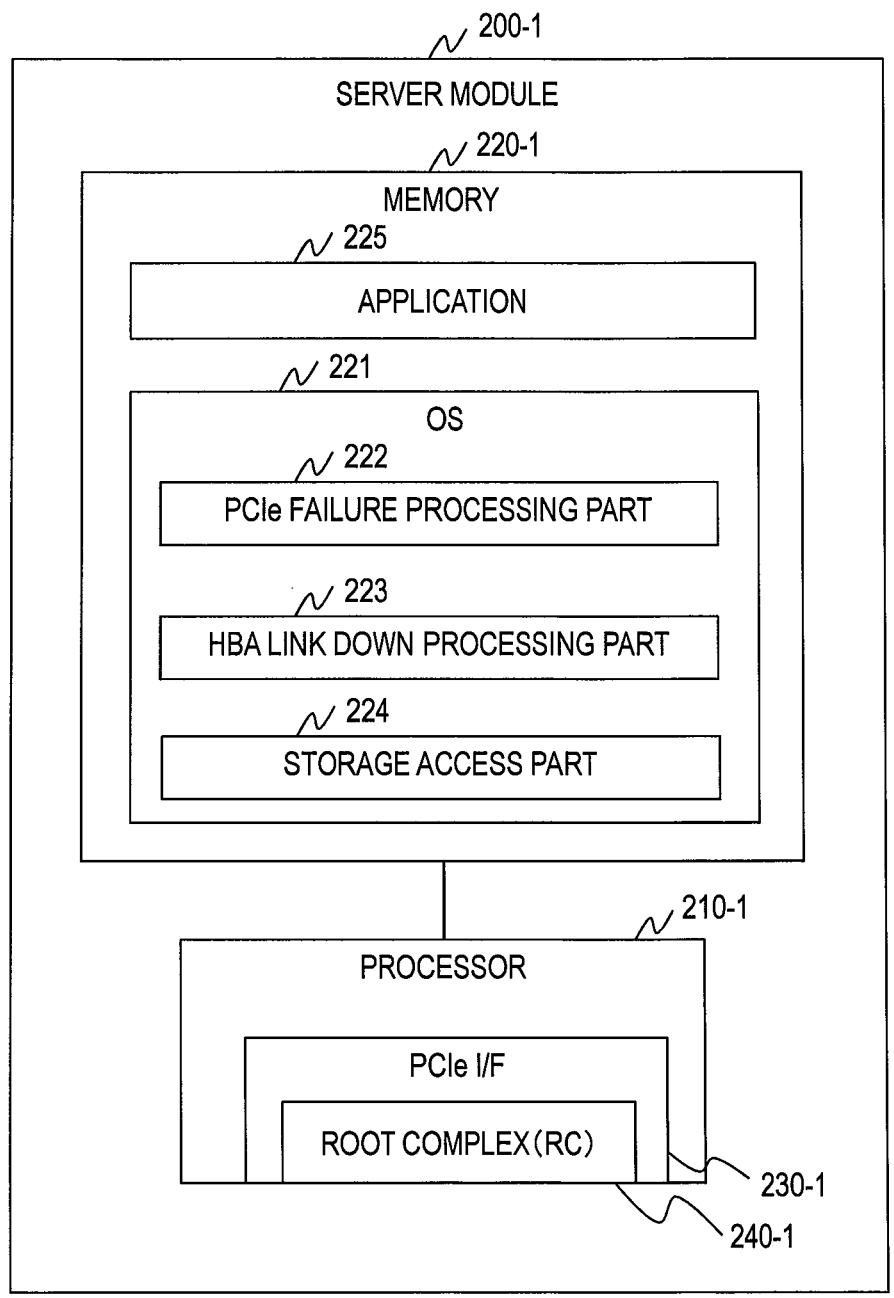
FIG. 2 shows the embodiment of this invention, and is a block diagram illustrating an example of the configuration of the server module.

The storage module 300 in this embodiment uses a plurality of storage devices to build a RAID, generates LUs from RAID volumes, and further provides the LUs to the server modules 200. The LUs store programs such as an OS 221, which is illustrated in FIG. 2, and an application 225, which is illustrated in FIG. 2, and information necessary for the execution of the programs.

The backplane 400 which couples the server modules 200 and the storage module 300 includes coupling modules 410-1 to 410-n, which are provided respectively for the server modules 200-1 to 200-n. The coupling modules 410-1 to 410-n have the same configuration, and a repetitive description is omitted.

The coupling module 410-1 has two PCI Express end points, and transfers data between the two end points. The end points of the coupling module 410-1 are an end point 420-1, which is connected to the PCIe I/F 230-1 of the server module 200-1, and an end point 430-1, which is connected to the PCIe I/F 340 of the storage module 300.

The end point 420-1 and the server module 200-1 are connected by a PCI Express link 500-1. The end point 430-1 and the storage module 300 are connected by a PCI Express link 510-1.

In the example here, the end point 420-1 connected to the server module 200-1 functions as a host bus adapter (HBA), and the end point 430-1 connected to the storage module 300 functions as a target bus adapter (TBA). While the end point 420-1 and the end point 430-1 use a Fibre Channel (FC) protocol to transfer data in the example of this embodiment, this embodiment is not limited thereto and SCSI, SAS, SATA, or other similar protocols may be employed instead. A detailed configuration of the coupling modules 410 is described later with reference to FIG. 4.

The coupling modules 410 can be installed as a chip (LSI) mounted on a circuit board of the backplane 400. However, this invention is not limited by how the coupling modules 410 are installed.

The links 500 and the links 510 include physical paths along which signals are transmitted and logical connections which indicate the hierarchy levels of communication or the like. The server modules 200 and the storage module 300 are loaded in, for example, slots provided in the backplane 400 in a manner that allows the modules to be slotted in and out freely.

FIG. 2 is a block diagram illustrating an example of the configuration of the server module 200-1 according to this embodiment.

The memory 220-1 stores programs for implementing the OS 221 and the application 225. The OS 221 stored in the memory 220-1 includes a storage access part 224, which accesses the storage module 300, a PCIe failure processing part 222, which executes recovery processing when a failure occurs in the PCI Express link 500-1 connected to the backplane 400 or in the PCIe I/F 230-1, and an HBA link down processing part 223, which executes processing of disengaging the coupling to the storage module 300.

In this embodiment, where the end point 420-1 to which the PCIe I/F 230-1 is connected is built from an HBA, the storage access part 224 accesses the end point 420-1 via an HBA driver.

The OS 221 includes the PCIe failure processing part 222 and the HBA link down processing part 223 in the example of this embodiment. However, this embodiment is not limited thereto and the server module 200-1 may be configured so that the PCIe failure processing part 222 and the HBA link down processing part 223 run on the OS 221.

The OS 221 manages the server module 200-1. The OS 221 has the storage access part 224 which controls access between the server module 200-1 and the storage module 300. The storage access part 224 can be implemented by, for example, a device driver for operating the coupling module 410-1.

The OS 221 has a file system and other functions (not shown), which are known functions and therefore omitted. The application 225 provides a given business operation. This invention is not limited by what type of application is included in the server modules 200.

The processor 210-1 operates as function parts that provide given functions by executing processing as programmed by programs of the respective function parts. For instance, the processor 210-1 functions as the PCIe failure processing part 222 by executing processing as programmed by a PCIe failure processing program. The same applies to other programs. The processor 210-1 also operates as function parts that provide respective functions of a plurality of processing procedures executed by each program. A computer and a computer system are a machine and a system that include these function parts.

Programs for implementing functions and information such as a table can be stored in the storage module 300, or in a non-volatile semiconductor memory, or in a storage device such as a hard disk drive or a solid state drive (SSD), or in a computer-readable non-transitory data storage medium such as an IC card, an SD card, and a DVD.

Figure 3:
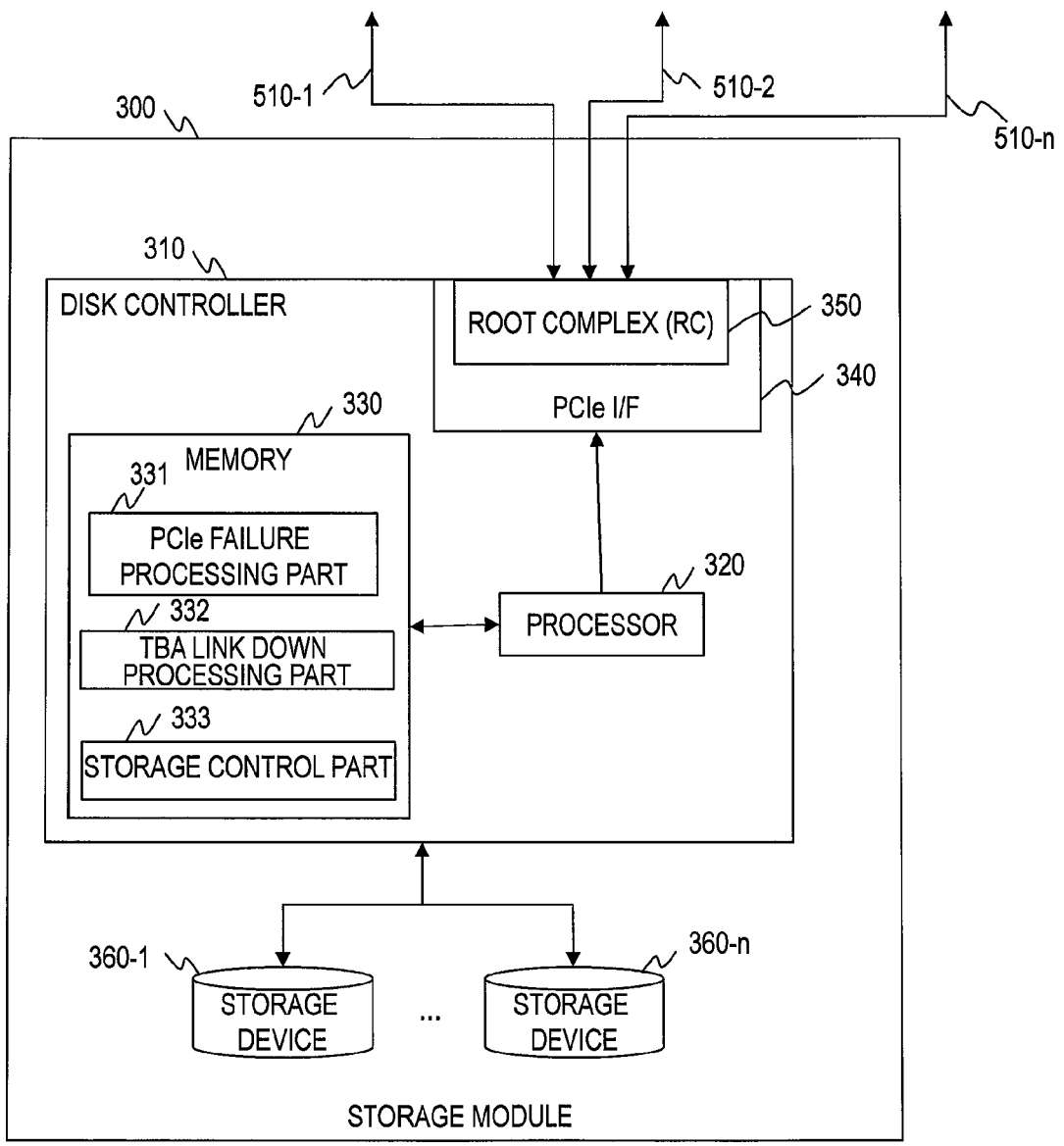
FIG. 3 shows the embodiment of this invention, and is a block diagram illustrating an example of the configuration of the storage module

FIG. 3 is a block diagram illustrating an example of configuration of the storage module 300 according to this embodiment.

The memory 330 stores programs that implement a storage control part 333, a TBA link down processing part 332, and a PCIe failure processing part 331.

The storage control part 333 controls I/O processing between the server modules 200 and the storage module 300. In this embodiment, the end points 430 to which the PCIe I/F 340 is connected are built from TBAs, and the storage control part 333 therefore accesses the end points 430 via a TBA driver. The storage control part 333 transfers data between the server modules 200 and the storage devices 360 via the end points 430.

The TBA link down processing part 332 executes, as described later, processing of disengaging the coupling to the server modules 200, which are coupled to the storage module 300 by the links 500. When receiving from one of the coupling modules 410 a notification that the coupling to the relevant server module 200 has been disengaged (a link down or disconnection notification), the disk controller 310 activates the TBA link down processing part (disconnection processing part) 332 to disengage the coupling to the server module 200 along the relevant link 500, and discards queued I/O (data and commands) of the server module 200 for which the link 500 has just been disconnected.

The PCIe failure processing part 331 executes given recovery processing when a failure occurs in one of the PCI Express links 510-1 to 510-n connected to the backplane 400, or in the PCIe I/F 340. When a failure occurs in the PCIe I/F 340 or one of the links 510, the disk controller 310 resets the PCIe I/F 340 to execute the failure recovery processing.

Figure 4:
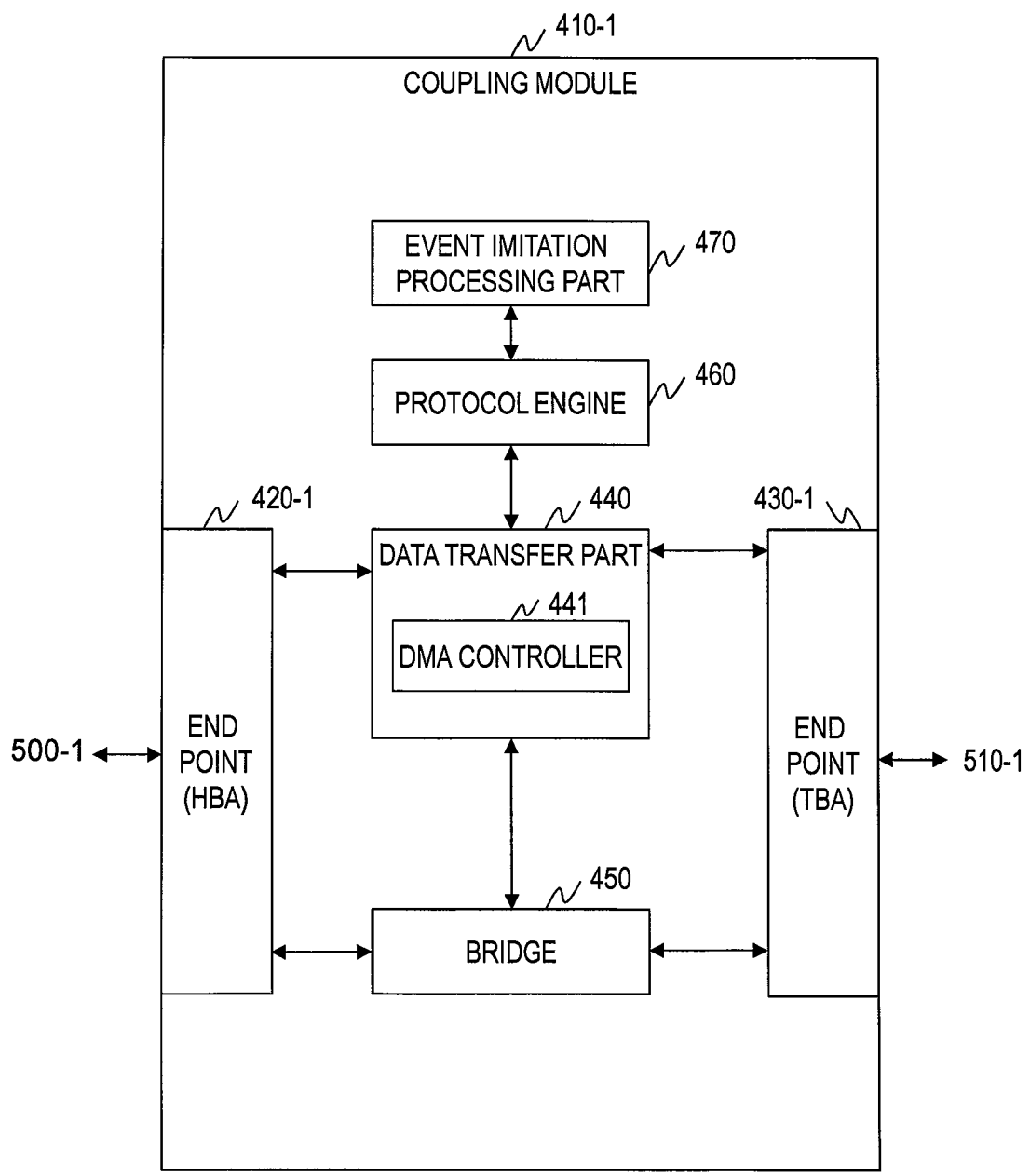
FIG. 4 shows the embodiment of this invention, and is a block diagram illustrating an example of the configuration of the coupling module.

FIG. 4 is a block diagram illustrating an example of the configuration of the coupling module 410-1 according to this embodiment. The same configuration is shared by the coupling modules 410-2 to 410-n, and a repetitive description is omitted.

The coupling module 410-1 includes a data transfer part 440, a protocol engine 460, a bridge 450, the end point 420-1, which functions as an HBA, the end point 430-1, which functions as a TBA, and an event imitation processing part 470.

The data transfer part 440 controls data transfer between the memory 220-1 of the server module 200-1 and the memory 330 of the storage module 300. The data transfer part 440 in this embodiment includes a DMA controller 441.

The DMA controller 441 controls DMA transfer between the memory 220-1 of the server module 200-1 and the memory 330 of the storage module 300.

The protocol engine 460 converts a command used by the server module 200-1 and a command used by the storage module 300. In other words, the protocol engine 460 converts a protocol on the end point 420-1 side and a protocol on the end point 430-1 side into each other.

The bridge 450 controls communication between devices that are connected via the end points 420-1 and 430-1. For instance, the bridge 450 converts PCI Express signals that differ from each other in lane count. The bridge 450 is used when the DMA transfer described above is unnecessary.

The end points 420-1 and 430-1 can be built from, for example, ports for connecting to a device. In this embodiment, the end point 420-1 is connected to the PCIe I/F 230-1 of the processor 210-1, and the end point 430-1 is connected to the PCIe I/F 340 of the disk controller 310.

The end point 420-1 detects the occurrence of a failure when the link 500-1 is reset or shut off, and notifies the protocol engine 460 of the failure. In other words, the end point 420-1 outputs a failure notification when a failure occurs in the PCIe I/F 230-1 of the server module 200-1 or in the link 500-1.

Receiving the failure notification, the protocol engine 460 activates the event imitation processing part 470. The event imitation processing part 470 converts the notification of a failure in the link 500-1 on the server module 200-1 side into a disconnection (link down or hot remove) notification which indicates that the link 500-1 has been disconnected. The event imitation processing part 470 transmits the disconnection (link down) notification generated by the conversion, instead of an anomaly notification, to the storage module 300 from the end point 430-1.

In the case where the coupling module 410-1 is built as a chip on the backplane 400, the coupling module 410-1 can be an application-specific integrated circuit (ASIC) which includes a processor and a memory, or a similar chip.

The end point 420-1 in the example given above outputs a failure notification to the protocol engine 460 when detecting a failure on the link 500-1 side. Alternatively, the coupling module 410-1 may be designed so that the event imitation processing part 470 is activated when the end point 420-1 outputs a failure notification.

The data transfer part 440, the protocol engine 460, and the event imitation processing part 470 may be implemented as one control part.

Figure 5:
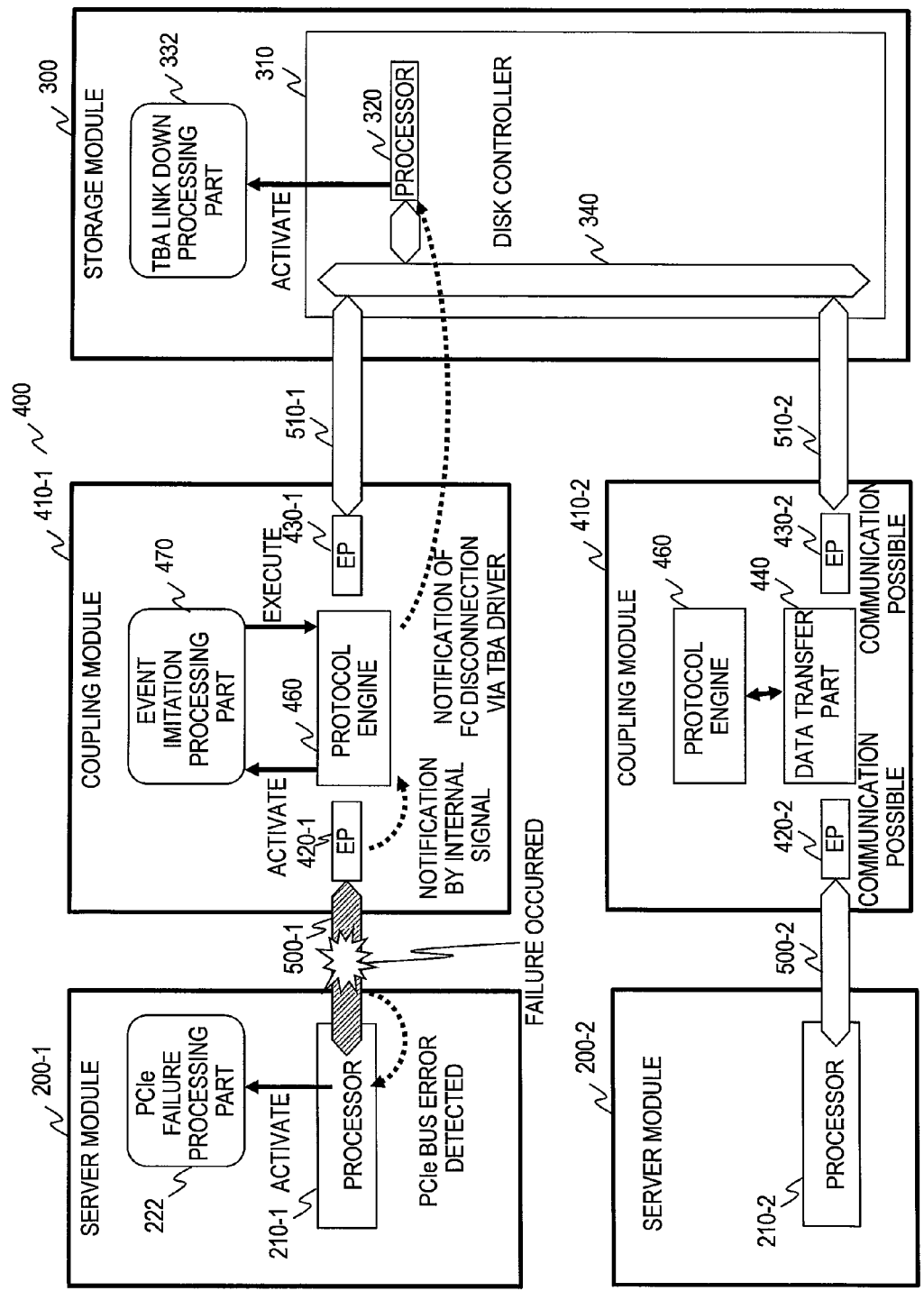
FIG. 5 shows the embodiment of this invention, and is a block diagram outlining processing that is executed when a failure occurs on the server module side.

FIG. 5 is a block diagram outlining processing that is executed when a failure occurs on the server module side.

FIG. 5 illustrates an example in which the server module 200-1 is coupled to the storage module 300 via the coupling module 410-1, and a failure has occurred in the link 500-1 on the server module 200-1 side. In the illustrated example, the server module 200-2 is coupled to the storage module 300 via the coupling module 410-2, and transfers data normally.

Normal data transfer is described first taking as an example a case where the server module 200-2 reads data out of the storage module 300 via the coupling module 410-2.

The OS 221 of the server module 200-2 calls up the storage access part 224 in response to a request to read data stored in the storage module 300 which is received from the application 225.

The storage access part 224 transmits the read request to the storage control part 333 of the disk controller 310 via the link 510-2. The read request is a command used in the server module 200-2 and is therefore in a different format from that of a command used in the storage module 300. In short, the server module 200-2 and the storage module 300 handle different protocols.

In the following description, a command used by the server modules 200 is referred to as server command and a command used by the storage module 300 is referred to as storage command.

The coupling module 410-2 receives the read request (server command) from the storage access part 224, converts the read request into a storage command, and transmits the converted read request (now a storage command) to the storage control part 333. Specifically, the following processing is executed.

The data transfer part 440 analyzes the received read request (server command). The data transfer part 440 finds out that the received read request (server command) is a server command to be transmitted to the storage module 300, and therefore instructs the protocol engine 460 to convert the command.

The protocol engine 460 converts the received read request (server command) through conversion into a storage command from a server command, and outputs the converted read request (now a storage command) to the data transfer part 440.

The data transfer part 440 transmits the input read command (storage command) to the storage control part 333 of the storage module 300.

The storage control part 333 receives the read request (storage command), reads data that is requested to be read out of the storage devices 360-1 to 360-*n*, stores the read data in the memory 330, and transmits a DMA transfer request to the coupling module 410-2.

Receiving the DMA transfer request, the coupling module 410-2 obtains the address of the destination which is the memory 220-2 of the server module 200-2, and the address of the source which is the memory 330 of the storage module 300. A well-known technology can be employed for the DMA transfer. For example, the DMA controller 441 of the data transfer part 440 obtains the destination address and the source address, and the DMA controller 441 transfers data in the memory 330 of the storage module 300 to the memory 220-2 of the server module 200-2.

The coupling module 410-2 accomplishes data transfer through the processing described above.

A case where a failure has occurred in the link 500-1 between the server module 200-1 and the coupling module 410-1 or in the PCIe I/F 230-1 is described next.

The processor 210-1 of the server module 200-1 detects that a failure has occurred in the PCIe I/F 230-1 or the link 500-1. The detected failure is, for example, a PCI Express bus error. This failure detection may be accomplished by, for example, the monitoring of the PCIe I/F 230-1 or the end point 420-1 through polling or similar processing performed by the OS 221, which is executed by the processor 210-1. Alternatively, the failure detection may be accomplished by the monitoring of the PCIe I/F 230-1 or the end point 420-1 through polling or similar processing performed by the storage access part 224. An HBA driver provided to the OS 221 may instead monitor the PCIe I/F 230-1 or the end point 420-1 through polling or similar processing in order to accomplish the failure detection. Software that detects a failure in the link 500-1 between the server module 200-1 and the coupling module 410-1 functions as a failure detecting part.

Detecting a failure in the link 500-1 or the PCIe I/F 230-1, the processor 210-1 activates the PCIe failure processing part 222 to execute given failure recovery processing such as resetting the PCIe I/F 230-1.

In this embodiment, when the I/O interface used is a PCI Express interface, it is sufficient if an error that needs the resetting of the PCIe I/F 230-1 is detected as a failure out of errors in the physical layer, the data link layer, and the transaction layer.

Next, the end point 420-1 in the coupling module 410-1 notifies the protocol engine 460 of the resetting of the link 500-1 or a failure. The protocol engine 460 activates the event imitation processing part 470 on the account that a failure has been detected in the link 500-1 or the PCIe I/F 230-1.

When a failure occurs on the end point 420-1 side (the HBA side), the event imitation processing part 470 notifies the disk controller 310 of the storage module 300 of FC disconnection (or link down) from the end point 430-1 side (the TBA side). In other words, the event imitation processing part 470 of the coupling module 410-1 converts a notification of a detected PCI Express failure into a notification of link down of the FC which is a protocol above PCI Express, and notifies the link down to the storage module 300. The event imitation processing module 470 discards, in advance, I/O between the server module 200-1 and the storage module 300 that has been waiting to be processed in the coupling module 410-1.

The processor 320 of the disk controller 310 receives the FC disconnection notification and activates the TBA link down processing part 332. Because FC connection is cut between the server module 200-1 and the coupling module 410-1, the TBA link down processing part 332 discards data and commands regarding the server module 200-1 that have been waiting to be processed (queued I/O), and finishes, in a normal fashion, processing of disengaging the coupling to the server module 200-1.

Meanwhile, the PCIe I/F 230-1 recovers in the server module 200-1 by the resetting. The end point 420-1 of the coupling module 410-1 notifies the protocol engine 460 of the re-established connection to the server module 200-1. The protocol engine 460 notifies the server module 200-1 of the failure in the link 500-1 or the PCIe I/F 230-1.

The storage access part 224 of the server module 200-1 receives the failure notification, discards data and commands regarding the storage module 300 that have been waiting to be processed (queued I/O), and completes recovery from the failure. The end point 420-1 of the coupling module 410-1 detects the recovery of the PCIe I/F 230-1 and the link 500-1, and then notifies link up of the link to the server module 200-1 to the storage module 300 via the protocol engine 460. Receiving the link up notification, the storage module 300 rebuilds an environment for data transfer to/from the server module 200-1, and resumes the data transfer.

In the manner described above, when a PCI Express failure occurs between the server module 200-1 and the coupling module 410-1, the coupling module 410-1 notifies the storage module 300 of disconnection in a protocol above the protocol of the PCIe I/F, instead of the PCI Express failure, while the PCIe I/F 230-1 is reset in the server module 200-1. This enables the storage module 300 to execute link down processing in a normal fashion for the link to the server module 200-1 while keeping the PCIe I/F 340 in operation.

The other server module connected to the PCIe I/F 340 of the storage module 300, namely, the server module 200-2, can thus maintain access to the storage module 300 without being affected by a failure in the PCIe I/F 230-1 of the server module 200-1.

Figure 6:
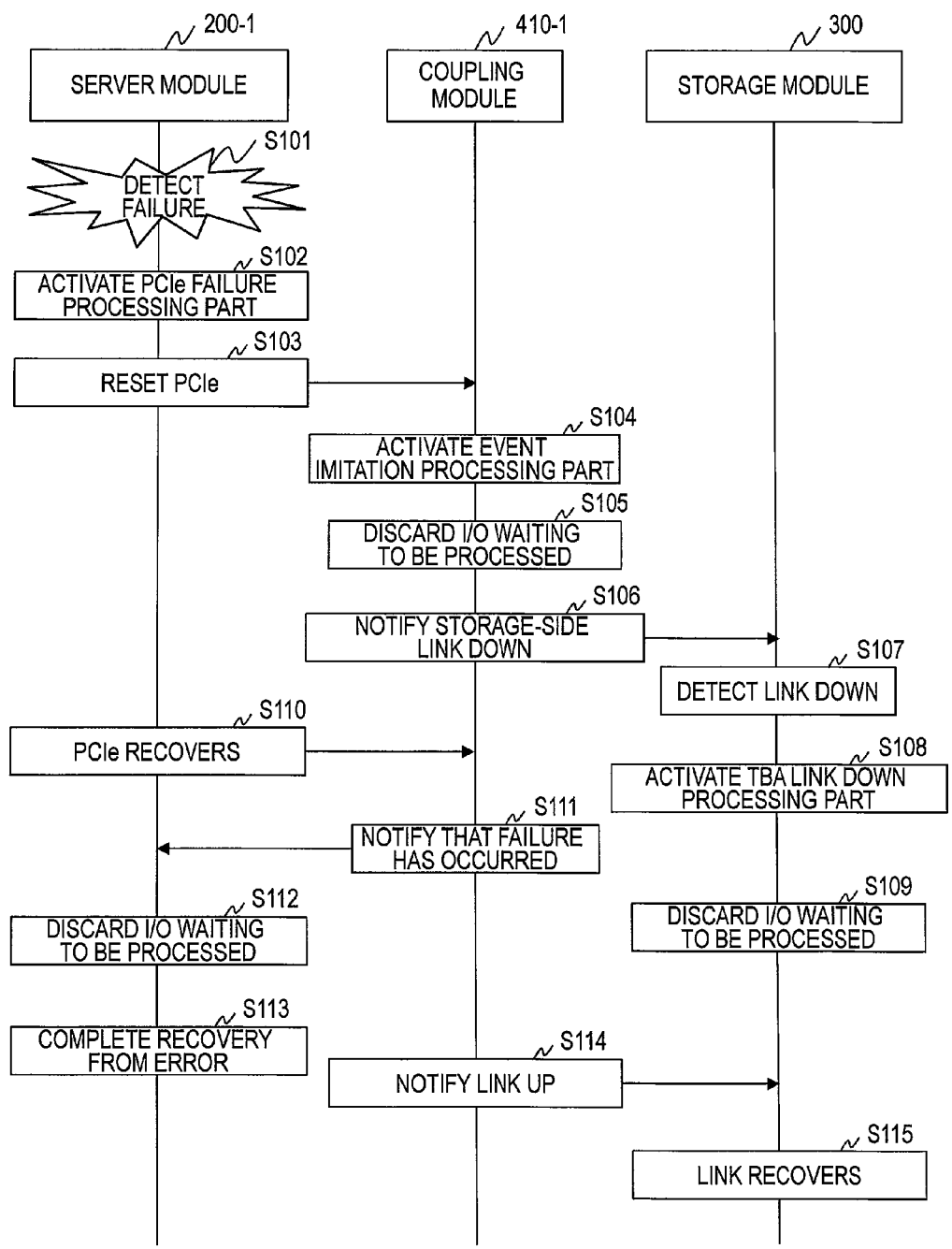
FIG. 6 shows the embodiment of this invention, and is a sequence diagram illustrating an example of processing that is executed when a failure occurs on the server module side.

FIG. 6 is a sequence diagram illustrating an example of processing that is executed when a failure occurs on the server module side.

In Step S101, the processor 210-1 of the server module 200-1 detects that a failure has occurred in the link 500-1 via the PCIe I/F 230-1. In Step S102, the processor 210-1 activates the PCIe failure processing part 222. In Step S103, the PCIe failure processing part 222 executes given failure recovery processing such as resetting the PCIe I/F 230-1.

The end point 420-1 of the coupling module 410-1 notifies the protocol engine 420 of the resetting of the link 500-1 or the failure. In Step S104, the protocol engine 460 activates the event imitation processing part 470 on the account that a failure has been detected in the link 500-1.

When a failure occurs on the end point 420-1 side (the HBA side) which is connected to the server module 200-1, the event imitation processing part 470 notifies the disk controller 310 of the storage module 300 of FC disconnection (or link down) from the end point 430-1 side (the TBA side) (S106). In other words, the event imitation processing part 470 of the coupling module 410-1 converts a notification of a detected PCI Express failure into a notification of link down of the FC which is a protocol above PCI Express, and notifies the link down to the storage module 300. Before notifying the link down, the event imitation processing part 470 discards I/O between the server module 200-1 and the storage module 300 that has been waiting to be processed (S105).

The processor 320 of the disk controller 310 receives the FC disconnection (link down) notification in Step S107 and activates the TBA link down processing part 332 in Step S108.

In Step S109, because FC connection is cut between the server module 200-1 and the coupling module 410-1, the TBA link down processing part 332 discards data and commands regarding the server module 200-1 that have been waiting to be processed (queued I/O), and finishes, in a normal fashion, processing of disengaging the coupling to the server module 200-1.

Meanwhile, the PCIe I/F 230-1 recovers in the server module 200-1 by the resetting (S110). The end point 420-1 of the coupling module 410-1 notifies the protocol engine 460 of the re-established connection to the server module 200-1. The protocol engine 460 notifies the server module 200-1 of the failure in the link 500-1 (S111).

The storage access part 224 of the server module 200-1 receives the failure notification in Step S111, discards data and commands regarding the storage module 300 that have been waiting to be processed (queued I/O) (S112), and completes recovery from the failure (S113). Thereafter, the end point 420-1 of the coupling module 410-1 detects the recovery of the link 500-1, and the protocol engine 460 notifies link up of the link to the server module 200-1 to the storage module 300 (S114).

In Step S115, the storage module 300 receives the link up notification from the coupling module 410-1, rebuilds an environment for data transfer to/from the server module 200-1, and resumes the data transfer.

In the manner described above, when a PCI Express failure occurs between the server module 200-1 and the coupling module 410-1, the coupling module 410-1 notifies the storage module 300 of link down (disconnection) in the FC protocol, which is a protocol above PCI Express, instead of the PCI Express failure, while the PCIe I/F 230-1 is reset in the server module 200-1. This enables the storage module 300 to execute link down processing in a normal fashion for the link to the server module 200-1 while keeping the PCIe I/F 340 in operation.

The other server module connected to the PCIe I/F 340 of the storage module 300, namely, the server module 200-2, can thus maintain access to the storage module 300 without being affected by a failure in the PCIe I/F 230-1 of the server module 200-1. The coupling module 410-1 issues to the storage module 300 a notification of disconnection of the link 500-1 which is converted from a notification of a failure on the server module 200-1 side. This prevents the resetting of the PCIe I/F 340 on the storage module 300 side, and accordingly prevents the impact of a failure in the PCIe I/F 230-1 of the server module 200-1 from spreading to the other server modules 200.

Specifically, if a failure in the PCIe I/F 230-1 of the server module 200-1 (a PCI bus error) is notified to the storage module 300 without modification as in the related-art examples described above, the disk controller 310 undesirably activates the PCIe failure processing part 331, which resets the PCIe I/F 340. Then data transfer between the server module 200-2 and the storage module 300 along the link 500-2 which is connected to the PCIe I/F 340 and which is normal is interrupted.

In contrast, this invention allows the storage module 300 to execute processing of disengaging the coupling to the server module 200-1 (e.g., link down or hot remove) by converting, in the coupling module 410-1, a notification of a failure in the PCIe I/F 230-1 on the server module 200-1 side into a notification of the disconnection of the link 500-1, and issuing the disconnection notification to the storage module 300.

In addition, this invention has no need to expand a PCI Express protocol unlike the related-art examples, and can therefore use existing chips, devices, and software, which means that the cost of the server apparatus 100 where the server modules 200 and the storage module 300 are coupled by PCI Express can be kept from rising.

While the protocol engine 460 activates the event imitation processing part 470 in the example given above, this invention is not limited thereto and the processing can be implemented by any control part of the coupling module 410-1.

The embodiment described above gives an example in which the coupling modules 410 are disposed in the backplane 400. However, this invention is not limited thereto and the coupling modules 410-1 to 410-*n* may be placed in, for example, the server modules 200-1 to 200-*n*, respectively. In this case, the server modules 200 and the storage module 300 may be coupled by a PCIe switch instead of the backplane 400.

The embodiment gives an example in which PCI Express interfaces are employed as I/O interfaces that couple the server modules 200 and the storage module 300. This invention, however, is not limited thereto.

The embodiment gives an example in which FC is used as a protocol above the I/O interface protocol. Other protocols such as SAS (SCSI) and SATA may be employed instead. A failure in an I/O interface, which is link down of a protocol above the I/O interface protocol in the example discussed in the embodiment, can be substituted by hot remove.

The invention of this application involves detecting, by the server module 200-1, a failure that necessitates the resetting of an I/O interface that couples the server module 200-1 and the storage module 300 via the coupling module 410-1, and resetting the I/O interface by the server module 200-1. The coupling module 410-1 detects that a failure has occurred based on the resetting by the server module 200-1, converts a notification of a failure in a communication protocol of the I/O interface into a notification of link disconnection, and transmits the disconnection notification to the storage module 300. The storage module 300 executes processing of disconnecting its link to the server module 200-1, and hence an I/O interface of the storage module 300 can keep running without being reset.

Some or all of the computer components, processing parts, processing means, and the like described above in this invention may be implemented by dedicated hardware.

The various types of software given above as an example in the embodiment can be stored in various recording media including electromagnetic, electronic, and optical recording media (e.g., non-transitory storage media), and can be downloaded onto a computer via a communication network such as the Internet.

This invention is not limited to the embodiment described above, and encompasses various modification examples. For instance, the above-mentioned embodiment is a detailed description of this invention that is intended for easier understanding, and this invention is not necessarily limited to a mode that includes all of the components described above.

What is claimed is:

1. A computer system, comprising:
    a server module;
    a storage module; and
    a coupling module,
    wherein the server module comprises:
        a first processor;
        a first memory;
        a first interface for coupling to other devices;
        a storage access part for requesting access to the storage module via the first interface;
        a failure detecting part for detecting a failure in the first interface; and
        a failure processing part for executing given recovery processing when the failure detecting part detects a failure in the first interface,
    wherein the coupling module comprises:
        a first end point which is connected to the first interface and, when detecting a failure in the first interface, outputs a failure notification;
        a second end point which is connected to a second interface of the storage module;
        a data transfer part for transferring data between the first end point and the second end point; and
        an event imitation part for converting the failure notification into a notification of disconnection of the first interface when the first end point outputs the failure notification, and transmitting the disconnection notification generated by the conversion to the storage module from the second end point, and
    wherein the storage module comprises:
        a second processor;
        a second memory;
        a storage device;
        the second interface for coupling to other devices;
        a storage control part for receiving an access request through the second interface and accessing the storage device; and
        a disconnection processing part for disengaging coupling to the server module when the disconnection notification is received from the coupling module.

2. The computer system according to claim 1, wherein the coupling module further comprises a protocol converting part for converting protocols between the first end point and the second end point, and transmits the disconnection notification by a protocol of the second end point.

3. The computer system according to claim 1, wherein the given recovery processing which is executed by the failure processing part of the server module comprises resetting of the first interface.

4. The computer system according to claim 1,
    wherein the computer system comprises a plurality of the server modules,
    wherein the computer system comprises a plurality of the coupling modules so that each of the plurality of the server modules is connected to one of the plurality of the coupling modules, and
    wherein the second end point of each of the plurality of the coupling modules is connected to the second interface of the storage module.

5. A control method for a computer system, the computer system comprising a server module, a storage module, and a coupling module,
    the server module comprising a first processor, a first memory, and a first interface for coupling to other devices,
    the storage module comprising a second processor, a second memory, a storage device, and a second interface for coupling to other devices,
    the coupling module comprising a first end point, which is connected to the first interface, and a second end point, which is connected to the second interface,
    the control method comprising:
    a first step of detecting, by the server module, a failure in the first interface;

a second step of executing, by the server module, given recovery processing when a failure is detected in the first interface;

a third step of using, by the coupling module, the first end point to detect a failure in the first interface and output a failure notification;

a fourth step of converting, by the coupling module, the failure notification into a notification of disconnection of the first interface, and transmitting the disconnection notification generated by the conversion to the storage module from the second end point; and a fifth step of disengaging, by the storage module, coupling to the server module when the disconnection notification is received from the coupling module.

6. The control method for a computer system according to claim 5, wherein the fourth step comprises transmitting, by the coupling module, the disconnection notification by a protocol of the second end point.

7. The control method for a computer system according to claim 5, wherein, in the second step, the given recovery processing which is executed by the server module comprises resetting of the first interface.

8. The control method for a computer system according to claim 5, wherein the computer system comprises a plurality of the server modules, wherein the computer system comprises a plurality of the coupling modules so that each of the plurality of the server modules is connected to one of the plurality of the coupling modules, and wherein the second end point of each of the plurality of the coupling modules is connected to the second interface of the storage module.

9. A coupling module for coupling a first device and a second device, comprising:

a first end point which is connected to a first interface of the first device and, when detecting a failure in the first interface, outputs a failure notification;

a second end point which is connected to a second interface of the second device;

a data transfer part for transferring data between the first end point and the second end point; and an event imitation part for converting the failure notification into a notification of disconnection of the first interface when the first end point outputs the failure notification, and transmitting the disconnection notification generated by the conversion to the second device from the second end point.

10. The coupling module according to claim 9, further comprising a protocol converting part for converting protocols between the first end point and the second end point, wherein the disconnection notification is transmitted by a protocol of the second end point.

* * * * *